United States Patent [19]

Walter

[11] 4,429,713

[45] Feb. 7, 1984

[54] SNAP CLOSURE COUPLING FOR FLOWING-MEDIA DUCTS

[75] Inventor: Friedrich C. Walter, Karlsruhe, Fed. Rep. of Germany

[73] Assignee: Argus Verwaltungsgesellschaft mbH, Ettlingen, Fed. Rep. of Germany

[21] Appl. No.: 275,350

[22] Filed: Jun. 19, 1981

[30] Foreign Application Priority Data

Nov. 6, 1980 [DE] Fed. Rep. of Germany ....... 3041909

[51] Int. Cl.³ ............................................. F16L 37/28
[52] U.S. Cl. .......................... 137/614.03; 137/614.05; 251/149.8
[58] Field of Search ...................... 137/614.03, 614.05; 251/149.8

[56] References Cited

U.S. PATENT DOCUMENTS

| 2,456,045 | 12/1948 | Brock | 137/614.03 |
| 2,689,138 | 9/1954 | Scheiwer | 137/614.03 |
| 2,739,374 | 3/1956 | Kaiser | 137/614.03 |
| 2,958,544 | 11/1960 | Wurzburger et al. | 137/614.03 |
| 3,348,575 | 10/1967 | Sinak | 137/614.05 |
| 3,500,059 | 3/1970 | Pearson | 137/614.05 |

FOREIGN PATENT DOCUMENTS 895396 11/1953 Fed. Rep. of Germany .

Primary Examiner—A. Michael Chambers
Attorney, Agent, or Firm—Max Fogiel

[57] ABSTRACT

A snap-closure coupling for flowing medium ducts has two halves one of which can be plugged into the other. The arrangement is such that the flow paths through both the plug half (which is connected to a medium source) and through the socket or sleeve half (which is connected to a reservoir, such as the applied brakes of a trailer) will be blocked when the plug half is pressureless and the sleeve half is pressurized. However, when the plug half is inserted into the sleeve half, the flow paths through both halves are automatically opened.

4 Claims, 3 Drawing Figures

SNAP CLOSURE COUPLING FOR FLOWING-MEDIA DUCTS

BACKGROUND OF THE INVENTION

The present invention relates to a snap closure for flow medium ducts. Snap closure couplings of that kind are for example used for the coupling of trailers to motor vehicles, wherein one coupling half is arranged firmly on the motor vehicle and the other at the free end of a pressure hose providing the connection to the trailer.

Irrespective of the different constructions of the plug part and sleeve part of a coupling of that kind, both the parts of such a coupling are for simplicity designated as "coupling halves" in the following.

In a flow medium coupling of this kind, which is described in the German Pat. No. 895 396, the closure piece of the one coupling half consists of a valve cone, which is received to be axially movable within a sleevelike housing which is provided with a valve seat surface. Rearwardly this valve cone bears against a closing spring and—in the uncoupled state—is held by this closing spring in closing position with the seat surface; it is also loadable by flow medium pressure when the coupling half is pressure-loaded. The closure piece of the other coupling half is a valve sleeve which is received to be axially movable on a hollow spigot with a seat surface at the front end and likewise—in the uncoupled state—is held by a closing spring in contact against this seat surface as well as being loadable at the rear side, i.e. in closing direction, by flow medium pressure. On coupling of the two halves, the valve sleeve engages with its end face a contact surface enclosing concentrically the valve cone of the other half in the region of the valve seat co-operating with the latter, the head of the hollow spigot receiving the valve sleeve thereagainst onto the valve cone so that the valve cone as well as the valve sleeve are urged into their opening positions during the coupling of both the halves.

The coupling of the halves in the case of the prior known flow medium coupling naturally can succeed only when both coupling halves are relieved of pressure. In many cases of use this prerequisite is, however, not fulfillable or only with difficulty. This is, for example, the case when a trailer equipped with hydraulic brakes is set down with its brakes on and the associated coupling half shall now be coupled with the coupling half which is disposed on the motor vehicle and thus is located on the side of the flow medium pressure source. Concerned in that case is the coupling half equipped with the valve cone, while the coupling half provided with the axially movable coupling sleeve is associated with the sink side. When the sink side stands under pressure loading, a pressure relief must be brought about through awkward manipulations before the two coupling halves can be coupled with each other, which naturally entails flow medium losses, before the valve sleeve is capable of executing the axial displacement which is unavoidable for the performance of the coupling operation.

SUMMARY OF THE INVENTION

It is an object of the invention to overcome the disadvantages of the prior art.

A more particular object is to so improve the known (and above described) flow medium coupling, that the two coupling halves can be freely and readily coupled with one another even when the coupling half at the sink side is subjected to flow medium pressure while the coupling half at the source side is free of pressure, as is for example the case with a vehicle trailer which has been set down (disconnected from the tractor) with its brakes on.

Proceeding from a snap closure coupling of the kind explained above, this problem is solved according to the invention in that the sleeve of the one coupling half receiving the valve cone is an annular piston which is guided to be axially movable in the sleevelike housing of the one coupling half and that the side of the piston which is remote from the valve seat surface bears against a prestressed compression spring and has a surface which is loadable by flow medium pressure and which is greater than the surface of the valve sleeve that is loadable by flow medium pressure in the other coupling half. Furthermore, the rearward loading surfaces and spring force supports of the valve sleeve on the one hand, and of the annular piston with the valve cone on the other hand, are so matched to each other that when the coupling half with the valve sleeve stands under pressure and the other coupling half is free of pressure, the valve sleeve and the valve cone remain in closing position, but the latter is displaced axially in the housing of the associated coupling half together with the annular piston receiving it. The piston, however, returns into its original position on a rearside flow medium pressure loading of the valve cone and of the annular piston receiving this to be axially movable, while its seat surface lifts off from the valve cone and the valve sleeve in the other coupling half is simultaneously displaced into its opening setting while freeing a throughflow path through the coupling.

Characteristic of the flow medium coupling according to the invention is thus the presence of an annular piston which receives the valve cone, is on the one hand guided to be axially movable in the housing of the associated coupling half and which is axially displaceable together with the valve cone out of the position corresponding to the uncoupled state during the coupling of both the coupling halves, while the valve sleeve forming the closure piece of the other coupling half, which during the coupling stands under flow medium pressure, remains in closing position in view of its rearside flow medium pressure loading and spring force support. When subsequently thereto pressure loading is now applied to the coupling half displaying the valve cone after both the coupling halves have been plugged together and locked in known manner, the annular piston enclosing the valve cone experiences a pressure medium loading additional to its rearside spring force support, and thereby an axial force which acts in the direction of its position corresponding to the uncoupled state and which predominates the oppositely directed axial force which acts on the valve sleeve of the other coupling half. Consequently, the annular piston experiences a corresponding axial displacement, during which the seat surface co-operating with the valve cone lifts off from the valve cone and at the same time displaces the valve sleeve of the other coupling half axially out of its closing position with the associated valve seat so that the flow path through the coupling is opened. A problem-free coupling of both the coupling halves is thus made possible without any flow medium loss.

The invention will hereafter be described with reference to exemplary embodiment as illustrated in the drawing. However, it is to be understood that this is strictly by way of explanation only and that the invention as set forth in the appended claims is not to be considered limited thereto.

DESCRIPTION OF PREFERRED EMBODIMENTS

Figure 1:
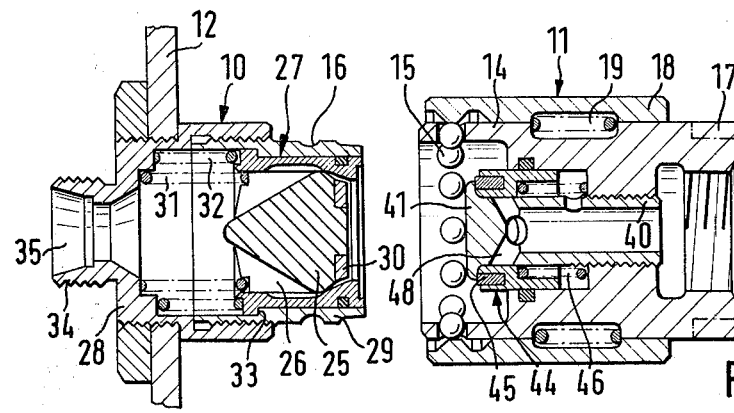
FIG. 1 shows both the coupling halves in positionally correct association with each other before coupling or after uncoupling.
Figure 2:
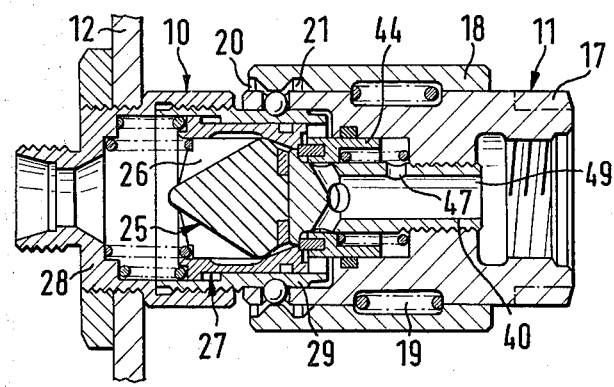
FIG. 2 shows the snap closure coupling with the coupling halves plugged into each other and locked in this coupling position, however with still closed flow paths and with the sleeve part under flow medium pressure and the plug part being free of pressure.
Figure 3:
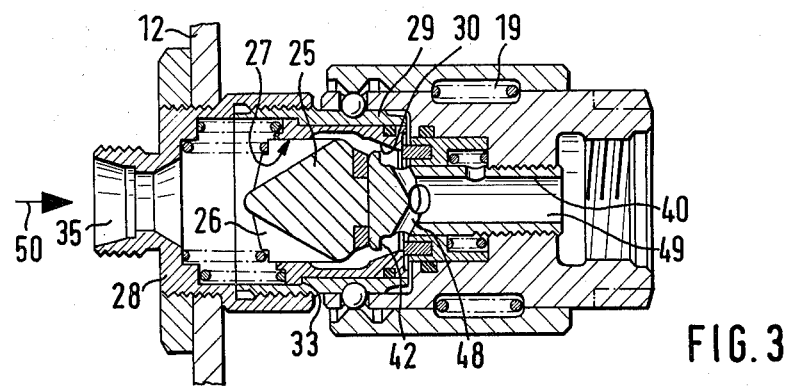
FIG. 3 illustrates the coupling in a view as in FIG. 2, but now with opened flow paths and with both coupling halves subjected to flow medium pressure.

The flow medium coupling illustrated in FIGS. 1-3 has a plug valve 10 and a sleeve valve 11. In the drawing, the plug valve is illustrated as a fixed installation in an only fragmentarily indicated bulkhead partition 12 of a vehicle the remainder of which is not shown but should be understood to have a flow medium pressure source. The sleeve valve thereagainst is associated with the sink side, for example a vehicle trailer, and is connected through a not shown pressure hose with the hydraulic system at the trailer side.

In the coupling positions shown in the FIGS. 2 and 3, the plug valve 10 engages into the one-sidedly open sleeve valve 11 and both coupling halves 10 and 11 are retained in this coupling position by means of blocking balls 15, which engage into an encircling annular groove 16 of the plug valve 10 and are held in their locking positions by a sleeve 18 slidably mounted on the housing 17 of the sleeve valve 11. The sleeve 18 serving to lock the balls 15 is biased in axial direction by means of a spring 19 stressed between this sleeve and the housing 17 of the sleeve valve 11. In the case of an axial displacement of the sleeve 18 relative to the sleeve valve 11, the blocking balls 15 can according to the direction of displacement escape radially into one of the two inner annular grooves 20 and 21 encircling the front end of the sleeve 11 at the inside thereof, in which positions the coupling or uncoupling of the coupling halves 10, 11 can take place. The details of this locking mechanism are state of the art and therefore require no further explanation.

Both coupling halves 10, 11 are equipped with closure pieces guided for movement in axial direction and loaded by closing springs in closing direction. Thus, the plug valve 10 possesses a closure piece in the form of a valve cone 25, which is received within an annular piston 27 and guided to be axially movable in the annular piston by means of radially extending guide vanes 26. The annular piston in its turn is likewise axially movable and fluid-tightly received in a plug sleeve 29, which is firmly connected with the rearward housing 28 of the plug valve 10 and extends axially beyond the housing 28 installed in the bulkhead wall 12; in the coupled state (FIGS. 2 and 3) the sleeve 29 engages in the open sleeve part 14 of the sleeve valve 11. The annular piston 27, in the region of its end remote from the rearward housing part 28, possesses a conical valve seat surface 30, which co-operates with a corresponding sealing surface of the valve cone 25. The valve cone 25 and the annular piston 27 bear rearwardly in the rearward plug part housing 28 against respective closing springs 31 and 32 and are held by these closing springs in the position shown in FIG. 1, which is determined in the annular piston 27 and in the sleeve part 29 fast with the housing by an annular surface 33 acting as abutment. For the remainder, a connecting stub 34 with a central flow path 35, providing the connection of the plug part to a flow medium pressure source of no further interest here, extends forth from the rearward housing part 28 on the side remote from the valve cone 25.

Firmly received in the sleeve-shaped housing 17 of the sleeve valve 11 is a central guide tube 40, which at its one end extends forth into the one-sidedly open sleeve part 14 for the reception of the plug valve. Received on this guide tube, the end section 41 of which reaches into the open sleeve part and is provided with a valve seat 42, is a valve sleeve 44, which is guided to be axially movable, sealed off relative to the housing, serves as closure piece of the sleeve valve 11 and the front end edge of which, in the region of which is arranged an annular seal 45, co-operates with the valve seat 42 of the guide tube 40. This valve sleeve 40 bears against a prestressed closing spring 46 on the side remote from the valve seat 42 and is beyond that loaded at the rear side by flow medium pressure through a flow channel 47 penetrating the guide tube 40. In view of this flow medium pressure loading and the rearsided spring force support, the valve sleeve 44 is held in sealing contact against the valve seat 42 at the front end of the guide tube 40. For the remainder, bores 48, directed obliquely rearwards and radially, extend immediately behind the valve seat through the wall of the guide tube 40 and open into the flow path 49 formed in the sleeve part by the guide tube 40. When the coupling halves, shown in separated positions in FIG. 1, are plugged together, in which case the one-sidedly open sleeve part 14 in the sleeve valve 11 engages over the plug sleeve 29 of the plug valve 10, the forward end surface of the guide tube end section 41 equipped with the valve seat meets onto the forward end surface of the valve cone 25 of the other coupling half and the outwardly facing, annular end surface of the annular piston 27 receiving the valve cone meets onto an annular surface, protruding radially beyond the end section 41 of the guide tube 40, of the valve sleeve 44 in the sleeve valve. The cross-sectional dimensions are in that case so chosen that the end section 41 of the guide sleeve 40 with the valve seat 42 engages into a corresponding recess in the annular piston 27 so that the stationary guide sleeve 40 of the sleeve valve meets onto the axially movable valve cone 25 received in the plug valve and the valve sleeve 44, enclosing the guide tube 40, of the sleeve valve co-operates with the annular piston 27 receiving the valve cone 25 of the plug valve.

Since the plug valve 10 is relieved of pressure during coupling and its closure piece and the annular piston are thus held in the position evident from FIG. 1 merely by the supporting effect of the associated closing springs 31 and 32, while the valve sleeve 44 of the sleeve valve 11 is loaded on the one hand at the rear side by spring force and on the other hand by flow medium pressure, the annular piston 27 and the valve cone 25 which is disposed in sealing contact with the valve seat surface 30 in the annular piston, are urged together into the axial position evident in FIG. 2, while the valve cone of the plug valve as well as the valve sleeve of the sleeve valve remain in contact with the associated seat surfaces 30 and 32. The end face of the annular piston 27 co-operating with the end face of the valve sleeve 44 on the one hand and the end faces of the guide tube 40 and of the valve cone 25 likewise co-operating in the coupling position on the other hand are correspondingly associated with one another in axial direction. The annular piston 27 and the valve cone 25 received therein to be axially movable can be displaced free of problems into the axial setting evident from FIG. 2, because the plug valve 10 is free of pressure and flow medium received in the interior space is displaced without substantial resistance during axial displacement of the named parts. When flow medium pressure is now applied to the plug valve after reaching the coupling position illustrated in FIG. 2, which the arrow 50 in FIG. 3 indicates, the valve cone 25 and the thereto concentric annular piston 27 experience a rearsided flow medium pressure loading so that an axial force, which results from spring force and flow medium pressure loading, acts counter to the movement of the annular piston executed during the coupling operation, which force predominates over the oppositely directed axial force of the valve sleeve 44 of the sleeve valve 11, which likewise results from a rearsided flow medium pressure loading and the effect of the closing spring 46 engaging at the valve sleeve. Under the effect of this axial force, the annular piston 27 is displaced in the plug valve up to the abutment 33 limiting its axial movement, in direction of the sleeve valve, whereby on the one hand the valve seat 30 in the annular piston 27 lifts off from the valve cone 25 supported on the locally fixed guide tube 40 of the sleeve valve and on the other hand the valve sleeve 44 in the sleeve valve is displaced out of its closing position illustrated in FIG. 2 into a setting in which the bores 48, directed obliquely rearwards, in the guide tube 40 are freed. In view of the thus effected lifting of both the closure pieces off from the associated valve seats 30 and 42, the flow path through the valve is freed. Consequently, a problem-free coupling operation is realized with the plug valve 10 relieved of pressure and the sleeve valve 11 loaded by pressure.

The invention is susceptible to a variety of changes and modifications which will be understood by those skilled in the art. Hence, all such modifications and changes are intended to be embraced within the ambit of the appended claims.

What is claimed is:

1. Snap closure coupling for flowing medium ducts with closure pieces arranged to be movable axially in two coupling halves (10, 11) which are in the form of a plug valve and a sleeve valve and are pluggable into each other and are lockable in the coupling position, said closure pieces being loaded in the closing direction by closing springs (31, 46) and, when the coupling halves are separated, being held in closing position with a respectively associated seating surface of the respective coupling half, one of the closure pieces (25, 44) being constructed as a valve cone (25) received within a sleeve (44) having a valve seating surface and the other as valve seat (42) enclosing a spigot-like (40) valve seat firmly arranged in the associated coupling half, and constantly loaded by flow medium pressure on the side remote from the valve seat (42), said valve sleeve (44) on the coupling of both the coupling halves meets by an end face onto a contact surface of the sleeve of the other coupling half receiving the valve cone, the spigot-like valve seat placing itself by its end face onto the valve cone and displaces said valve cone in direction of its opening setting, the improvement comprising: the sleeve (29) of the one coupling half (10) receiving the valve cone (25) being an annular piston (27) guided to be axially movable in the sleeve-like housing (28, 29) of the one coupling half and the side of which remote from the valve seat surface (30) bears against a prestressed compression spring (32) and has a surface which is loadable by flow medium pressure and which is greater than the surface of the valve sleeve (44) loadable by flow medium pressure in the other coupling half, the rearward loading surfaces and spring supports of the valve sleeve (44) on the one hand and of the annular piston (27) with the valve cone (25) on the other hand being so matched to each other that, when the coupling half (11) with the valve sleeve (44) stands under pressure and the other coupling half (10) is free of pressure, the valve sleeve (44) and the valve cone (25) remain in closing position, but said valve cone being displaced axially together with the annular piston (27) receiving it, said annular piston however returning into its original position on a rearsided flow medium pressure loading of the valve cone and of the annular piston to be axially movable, while its seat surfaces (30) lifts off from the valve cone (25) and the valve sleeve (44) in the other coupling half (11) is simultaneously displaced into its opening setting while freeing a throughflow path, whereby the coupling half is free of pressure when the other coupling half is under high pressure, after coupling the two halves the closure pieces of both halves remaining in closed position through the coupling for as long as flow medium pressure acts on said one coupling half resulting in release of axial displacement of said annular piston whle said valve cone is stationary and the flow passages of both coupling halves become simultaneously opened.

2. Snap closure coupling for flowing medium ducts as defined in claim 1, including one coupling half connected to a pressure fluid source and another coupling half connected to a pressure reservoir, said one half being insertable into said other half, each of said halves including blocking means normally blocking fluid flow through the respective half in the uncoupled condition of said halves; and means for unblocking said blocking means in said one valve half when said valve halves are coupled and said one valve half is unpressurized while said other valve half is pressurized.

3. The coupling of claim 2, wherein said one valve half has a first housing, an annular piston slidable in said housing against a first biasing force, and a valve cone slidable in said annular piston against a second biasing force.

4. The coupling of claim 3, wherein said other valve half has a second housing and a valve sleeve slidable in said second housing and having a surface exposed to pressure from said reservoir so that said valve sleeve is normally biased to a position in which it closes the flowpath through said other valve half.

* * * * *